United States Patent
Hayamizu

(10) Patent No.: US 9,971,292 B2
(45) Date of Patent: May 15, 2018

(54) IMAGE FORMING APPARATUS THAT UPDATES INFORMATION

(71) Applicant: KYOCERA Document Solutions Inc., Osaka-shi, Osaka (JP)

(72) Inventor: Hitoshi Hayamizu, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/718,597

(22) Filed: Sep. 28, 2017

(65) Prior Publication Data

US 2018/0095395 A1    Apr. 5, 2018

(30) Foreign Application Priority Data

Sep. 30, 2016  (JP) .................................. 2016-193174

(51) Int. Cl.
*G03G 15/00* (2006.01)
*H04N 1/00* (2006.01)
*G03G 21/16* (2006.01)

(52) U.S. Cl.
CPC ..... *G03G 15/5075* (2013.01); *G03G 15/5054* (2013.01); *G03G 21/1657* (2013.01); *H04N 1/0005* (2013.01); *H04N 1/00015* (2013.01); *H04N 1/00037* (2013.01); *H04N 1/00082* (2013.01); *H04N 1/0097* (2013.01); *H04N 1/00408* (2013.01)

(58) Field of Classification Search
CPC .......... G03G 15/5054; G03G 15/5075; G03G 21/1657; G03G 2221/1823; G03G 2215/0697; H04N 1/00015; H04N 1/00037; H04N 1/0005; H04N 1/00082; H04N 1/00408; H04N 1/0097
See application file for complete search history.

(56) References Cited

U.S. PATENT DOCUMENTS 9,817,362 B2 * 11/2017 Hirayama .......... G03G 21/1652
2008/0145067 A1 * 6/2008 Maeda .................. G03G 21/20
399/8

FOREIGN PATENT DOCUMENTS

JP         2011197434 A        10/2011

* cited by examiner

*Primary Examiner* — Hoang Ngo
(74) *Attorney, Agent, or Firm* — Alleman Hall Creasman & Tuttle LLP

(57) ABSTRACT

An image forming apparatus includes a storage and a controller. When it is determined that a temperature detected by a temperature detector is equal to or higher than a reference temperature, the controller stops a wireless communication between an RFID tag and a reader/writer. In addition, when a predetermined condition for determining that the detected temperature is lower than the reference temperature is satisfied, the controller starts the wireless communication between the RFID tag and the reader/writer, and causes the reader/writer to update information stored in the RFID tag to update information that was stored in the storage between a time point when it was determined that the temperature detected by the temperature detector is equal to or higher than the reference temperature and a time point when the predetermined condition was satisfied.

6 Claims, 3 Drawing Sheets

IMAGE FORMING APPARATUS THAT UPDATES INFORMATION

INCORPORATION BY REFERENCE

This application is based upon and claims the benefit of priority from the corresponding Japanese Patent Application No. 2016-193174 filed on Sep. 30, 2016, the entire contents of which are incorporated herein by reference.

BACKGROUND

The present disclosure relates to an image forming apparatus including a toner container provided with an RFID tag.

An electrophotographic image forming apparatus for forming an image on a sheet may include an RFID tag that stores information regarding a replacement unit such as a toner container. The information stored in the RFID tag is read and updated by a reader/writer that includes an antenna, a transmission circuit, and a reception circuit. The reception circuit of the reader/writer includes a filter circuit that attenuates carrier waves of unnecessary frequencies and allows carrier waves of necessary frequencies to pass. The filter circuit has temperature dependence on the frequency of the carrier wave it filters. As a result, when the filter circuit of the reader/writer becomes high temperature, its filtering characteristics of the carrier wave may change, and a communication distance between the antenna of the reader/writer and the RFID tag may become shorter. There is known an image forming apparatus in which a fan forms a passage of air, and the RFID tag and the reader/writer are disposed in the passage of air.

SUMMARY

An image forming apparatus according to an aspect of the present disclosure includes an image former, a toner container, a toner container attachment, an RFID tag, a reader/writer, a storage, a temperature detector, and a controller. The image former includes a developing portion configured to form a toner image on an image carrier. The toner container stores toner that is supplied to the developing portion. To the toner container attachment, the toner container is detachably attached. The RFID tag is provided on the toner container and configured to store predetermined information. The reader/writer is configured to perform a wireless communication with the RFID tag in a state where the toner container is attached to the toner container attachment. The storage is configured to store update information that is to be written to the RFID tag. The temperature detector is configured to detect a temperature or an ambient temperature of the reader/writer. The controller is configured to execute a first determination processor and a communication controller. The first determination processor is configured to determine whether or not a temperature detected by the temperature detector is equal to or higher than a predetermined reference temperature. The communication controller is configured to, when the first determination processor has determined that the temperature detected by the temperature detector is equal to or higher than the reference temperature, stop the wireless communication between the RFID tag and the reader/writer, and when a predetermined condition for determining that the temperature detected by the temperature detector is lower than the reference temperature is satisfied, start the wireless communication between the RFID tag and the reader/writer and cause the reader/writer to update information stored in the RFID tag to the update information that was stored in the storage between a time point when the first determination processor determined that the temperature detected by the temperature detector is equal to or higher than the reference temperature and a time point when the predetermined condition was satisfied.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

First, a configuration of an image forming apparatus according to an embodiment of the present disclosure is described with reference to FIG. 1 and FIG. 2.

Figure 1:
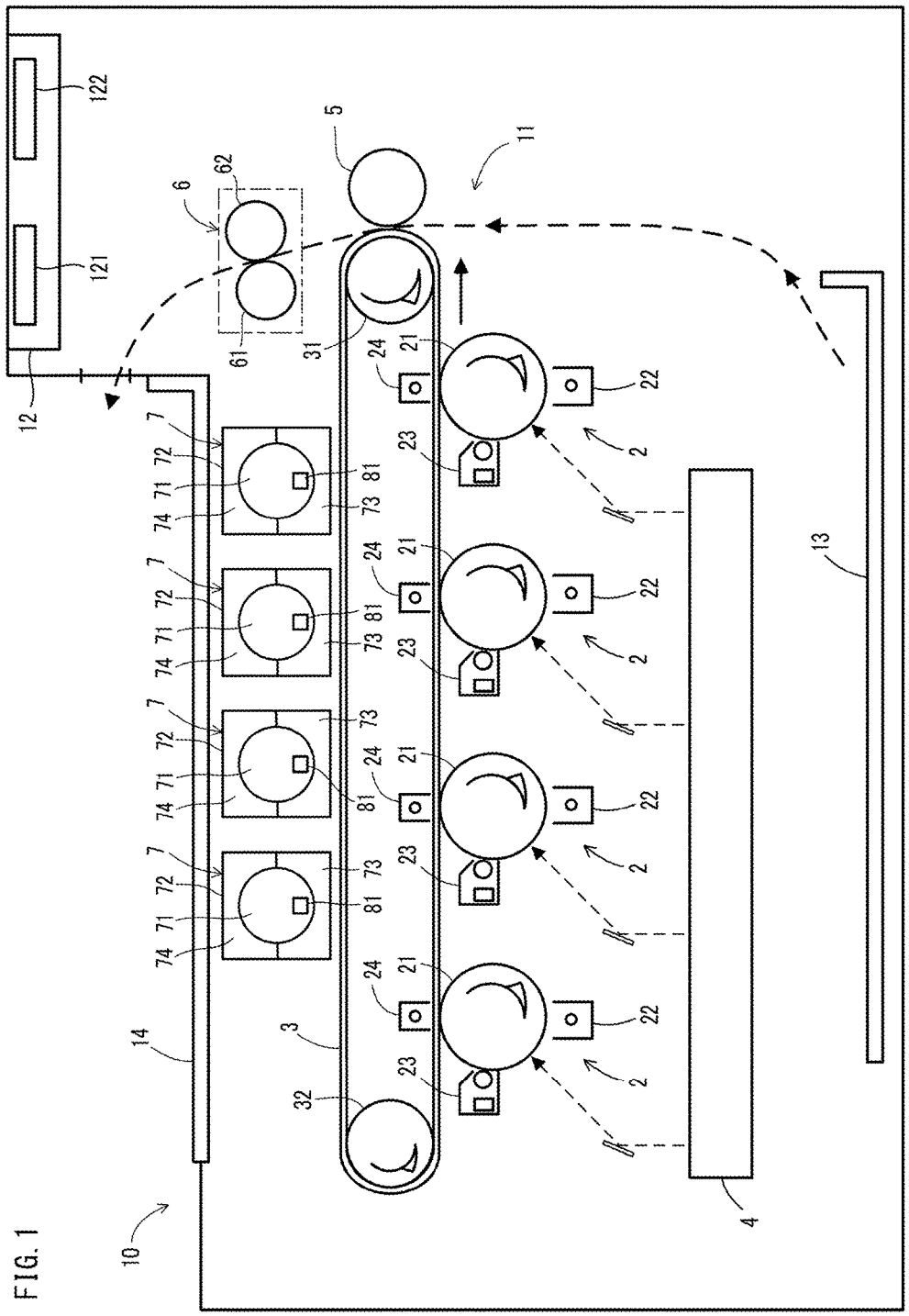
FIG. 1 is a schematic diagram showing an image forming apparatus according to an embodiment of the present disclosure.

An image forming apparatus 10 shown in FIG. 1 is a printer that can form a color image on a sheet by an electrophotographic system by using developer including toner. It is noted that the present disclosure is applicable to, for example, a monochrome printer, a copier, a facsimile, and a multifunction peripheral, as well as a color printer.

The image forming apparatus 10 includes an image former 11, an operation/display 12, a sheet feed tray 13, and a sheet discharge tray 14.

The image former 11 includes a plurality of image forming units 2, an intermediate transfer belt 3, an exposure device 4, a secondary transfer roller 5, a fixing device 6, and a plurality of toner replenishing devices 7.

Each of the image forming units 2 includes a photoconductor drum 21 (an example of the image carrier of the present disclosure) configured to carry a toner image, a charging device 22, a developing device 23 (an example of the developing portion of the present disclosure) configured to form the toner image on the photoconductor drum 21, and a primary transfer device 24.

The intermediate transfer belt 3 carries a color toner image formed from toner images of a plurality of colors (in the present embodiment, four colors). The intermediate transfer belt 3 is supported by a driving roller 31 and a driven roller 32 so as to be rotationally driven by them. The intermediate transfer belt 3 is configured to move while its surface is in contact with surfaces of the photoconductor drums 21.

The secondary transfer roller 5 transfers the toner image transferred to the intermediate transfer belt 3, to a sheet conveyed from the sheet feed tray 13. The sheet with the toner image transferred thereto is conveyed to the fixing device 6 by a conveyer (not shown). The fixing device 6 includes a heating roller 61 and a pressure roller 62. The fixing device 6 conveys the sheet with the toner image transferred thereto, while adding heat and pressure thereto. This allows the toner image to be fused and fixed to the sheet. The sheet with the toner image fixed thereto is further conveyed to the downstream side, and is ejected onto the sheet discharge tray 14 that is disposed above the intermediate transfer belt 3.

The plurality of toner replenishing devices 7 are provided above the intermediate transfer belt 3. In the present embodiment, four toner replenishing devices 7 are provided in correspondence with colors of black, yellow, cyan, and magenta, respectively. Each of the toner replenishing devices 7 includes a toner container 71 and a toner container attachment 72.

Each toner container 71 stores toner that is supplied to the developing device 23. The toner container 71 includes an inner space in which the toner is stored, and is formed approximately in the shape of a cylinder as a whole.

Each toner container 71 is provided with an RFID tag 81. The RFID tag 81 includes, for example, a coil antenna and an IC chip (both are not shown). The IC chip is connected to the coil antenna and configured to store predetermined information. The predetermined information includes information regarding the toner container 71 and information regarding the remaining amount of toner in the toner container 71 (an example of the update information of the present disclosure), wherein the information regarding the toner container 71 includes, for example, information regarding the image forming apparatus 10 to which the toner container 71 is applicable, and information regarding a color of toner stored in the toner container 71, and the information regarding the remaining amount of toner in the toner container 71 includes, for example, a printing dot count. The RFID tag 81 is configured to perform a wireless communication with a reader/writer 82 (see FIG. 2) via the coil antenna with a carrier wave of a predetermined frequency (for example, 13.56 MHz). It is noted that the reader/writer 82 is described in detail below.

The toner container 71 is detachably attached to the toner container attachment 72. The toner container attachment 72 includes a support base 73 and a cover 74. The support base 73 supports a lower half of an outer circumferential part of the toner container 71. The cover 74 covers an upper half of the outer circumferential part of the toner container 71. The toner container attachment 72 supports the toner container 71 in such a way as to cover the whole outer circumferential part of the toner container 71, with the cover 74 being coupled with the support base 73.

The operation/display 12 includes an operation portion 121 and a display 122. The operation portion 121 is operated by the user to input information to the image forming apparatus 10, and is composed of hard keys, for example. The display 122 displays information such as the information regarding the remaining amount of toner. The display 122 is, for example, a liquid crystal display. The display 122 may include a touch panel. The touch panel may be used as the operation portion 121, as well. When the touch panel is used as the operation portion 121, the hard keys may be omitted.

Figure 2:
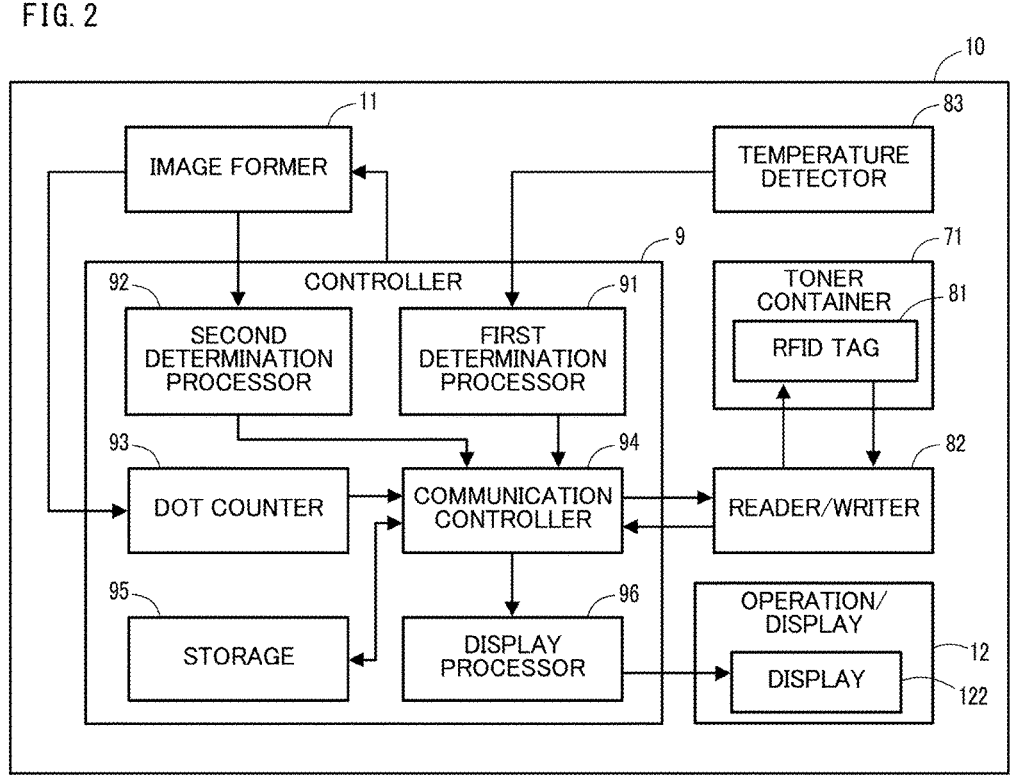
FIG. 2 is a block diagram showing a configuration of a controller of the image forming apparatus of FIG. 1.

As shown in FIG. 2, the image forming apparatus 10 further includes the reader/writer 82, a temperature detector 83, and a controller 9.

Meanwhile, the reader/writer 82 may receive heat, for example, from the fixing device 6 during formation of an image on a sheet and become high temperature. When the reader/writer 82 becomes high temperature, a distance that allows the reader/writer 82 to perform a wireless communication with an RFID tag 81 may be shortened to such an extent where the wireless communication between the reader/writer 82 and the RFID tags 81 cannot be performed. On the other hand, since the reader/writer 82 is provided in the vicinity of the toner containers 71, it is difficult to adopt a configuration in which the reader/writer 82 is cooled by a cooling fan. That is, it is difficult to secure, in the vicinity of the toner containers 71, a space for installing the fan or a passage of air blown from the fan. In addition, when a fan is used to cool, toner may be scattered by the fan. Furthermore, since a plurality of RFID tags 81 may vary in heat resistance, even when temperatures of the RFID tags 81 are the same, the RFID tags 81 may be different in the distance by which the reader/writer 82 performs a wireless communication with each RFID tag 81. Due to these factors, in an environment in which the reader/writer 82 becomes high temperature during an image formation and the like, an appropriate wireless communication may not be performed between the reader/writer 82 and the RFID tags 81, and the information regarding the remaining amount of toner or the like may not be updated appropriately. In the image forming apparatus 10 according to the present embodiment, even in an environment where the reader/writer 82 that performs a wireless communication with the RFID tags 81 of the toner containers 71 becomes high temperature, or even in a case where there is variation between products of the RFID tags 81 in distance by which the reader/writer 82 performs a wireless communication with the RFID tags 81, it is possible to update information of the RFID tags 81 appropriately.

The reader/writer 82 is configured to perform a wireless communication with the RFID tags 81 in a state where the toner containers 71 are attached to the toner container attachments 72. The reader/writer 82 includes an antenna, a transmission circuit, and a reception circuit, and performs a wireless communication with the RFID tags 81 via the antenna with a carrier wave of, for example, 13.56 MHz. In addition, the reader/writer 82 supplies power to the IC chips of the RFID tags 81 with the carrier wave. In the case where the frequency of the carrier wave is 13.56 MHz, the reader/writer 82 is disposed in a range of 10 mm from the RFID tags 81, by considering the variation between products of the RFID tag 81 and the changes of the frequency characteristics at high temperature. The distance between antenna of the reader/writer 82 and each RFID tag 81 is preferably 5 mm or less, more preferably 3 mm or less, and even more preferably 1.5 mm or less. It is noted that the reader/writer 82 may be disposed at a position where it comes into contact with the RFID tags 81 when the toner containers 71 are attached to the toner container attachments 72.

The temperature detector 83 detects the temperature or the ambient temperature of the reader/writer 82. The temperature detector 83 is disposed in such a way as to be in contact with the reader/writer 82, or in the vicinity of the reader/writer 82. It is noted that the temperature detector 83 is, for example, a thermistor.

The controller 9 is configured to comprehensively control the image former 11, and is composed of, for example, an engine board that includes a CPU, a ROM, and a RAM. The controller 9 includes a first determination processor 91, a second determination processor 92, a dot counter 93, a communication controller 94, a storage 95, and a display processor 96. The processes performed by the first determination processor 91, the second determination processor 92, the dot counter 93, the communication controller 94, the storage 95, and the display processor 96 are implemented by calculation processes performed by the CPU of the controller 9. That is, the controller 9 executes the processes of the first determination processor 91, the second determination processor 92, the dot counter 93, the communication controller 94, the storage 95, and the display processor 96, by causing the CPU or the like to perform the calculation processes.

The first determination processor 91 determines whether or not a temperature detected by the temperature detector 83 is equal to or higher than a reference temperature. The reference temperature may be set based on the variation between products of the RFID tag 81, the changes of the frequency characteristics of the reader/writer 82 at high temperature or the like. The reference temperature is, for example, in a range from 50° C. to 70° C., and is typically 60° C.

The second determination processor 92 determines whether or not an image formation on a sheet is being performed by the image former 11. For example, upon receiving image data, the second determination processor 92 determines that an image formation by the image former 11 has been started. On the other hand, when a sheet of the last page is discharged to the sheet discharge tray 14, the second determination processor 92 determines that an image formation by the image former 11 has been ended. In this way, the second determination processor 92 determines whether or not an image formation on a sheet is being performed by detecting a start time point and an end time point of the image formation on a sheet. In addition, the second determination processor 92 may monitor driving of a specific component, such as the fixing device 6, of the image former 11, and determine a time period for which the specific component is driven, as a time period for which an image formation by the image former 11 is performed.

The dot counter 93 counts the number of printed dots when an image is formed on a sheet. The number of printed dots is proportional to the toner consumption, and the remaining amount of toner in the toner container 71 is calculated by counting the number of printed dots. It is noted that the dot counter 93 counts the number of printed dots individually for each of the black toner, yellow toner, cyan toner, and magenta toner.

The communication controller 94, when the first determination processor 91 has determined that the detected temperature is equal to or higher than the reference temperature, stops the wireless communication between the RFID tag 81 and the reader/writer 82. In addition, while stopping the wireless communication between the RFID tag 81 and the reader/writer 82, the communication controller 94 stores, in the storage 95, update information that is to be written to the RFID tag 81.

The update information is, for example, information regarding the remaining amount of toner in the toner container 71. The information regarding the remaining amount of toner may be a cumulative value of the printing dot counts, or a remaining amount of toner calculated from the printing dot counts. On the condition that the first determination processor 91 determines that the detected temperature is equal to or higher than the reference temperature, and the second determination processor 92 determines that an image formation is being performed by the image former 11, the communication controller 94 may stop the wireless communication between the RFID tag 81 and the reader/writer 82. That is, the communication controller 94 may stop the wireless communication between the RFID tag 81 and the reader/writer 82 in a state where there is a possibility that the information regarding the remaining amount of toner is updated, and there is a possibility that the temperature of the reader/writer 82 increases.

On the other hand, in a state where the wireless communication between the RFID tag 81 and the reader/writer 82 is stopped, when a predetermined condition for determining that the detected temperature is lower than the reference temperature is satisfied, the communication controller 94 starts the wireless communication between the RFID tag 81 and the reader/writer 82. In the present embodiment, the predetermined condition is, for example, (a) that the first determination processor 91 determines that the detected temperature is lower than the reference temperature, (b) that the second determination processor 92 determines that an image formation is not being performed by the image former 11, or (c) that the first determination processor 91 determines that the detected temperature is lower than the reference temperature and the second determination processor 92 determines that an image formation is not being performed by the image former 11. In addition, when a wireless communication between the RFID tag 81 and the reader/writer 82 is started, the communication controller 94 causes the reader/writer 82 to update the information stored in the RFID tag 81 to the update information stored in the storage 95. In addition, the communication controller 94 may start a wireless communication between the RFID tag 81 and the reader/writer 82 on the condition that the second determination processor 92 determines that an image formation is not being performed by the image former 11, for a reason that is opposite to the reason for which a wireless communication between the RFID tag 81 and the reader/writer 82 is stopped.

The storage 95 is configured to store the update information that is to be written to the RFID tag 81, between a time point when the first determination processor 91 determines that the detected temperature is equal to or higher than the reference temperature and a time point when the predetermined condition is satisfied. The storage 95 may be a volatile memory or a nonvolatile memory, and is, for example, a RAM or an EEPROM.

The display processor 96 displays, on the display 122, the remaining amount of toner in the toner container 71 based on the information regarding the remaining amount of toner such as the printing dot count. At this time, the display processor 96 calculates the remaining amount of toner in the toner container 71 from the information regarding the remaining amount of toner such as the printing dot count stored in the RFID tag 81. The display processor 96 may display the remaining amount of toner on the display 122 in real time. Alternatively, the display processor 96 may display the remaining amount of toner when the remaining amount of toner has become small (when the replacement timing of the toner container 71 comes soon), or when the toner is used up (when the toner container 71 needs to be replaced).

Figure 3:
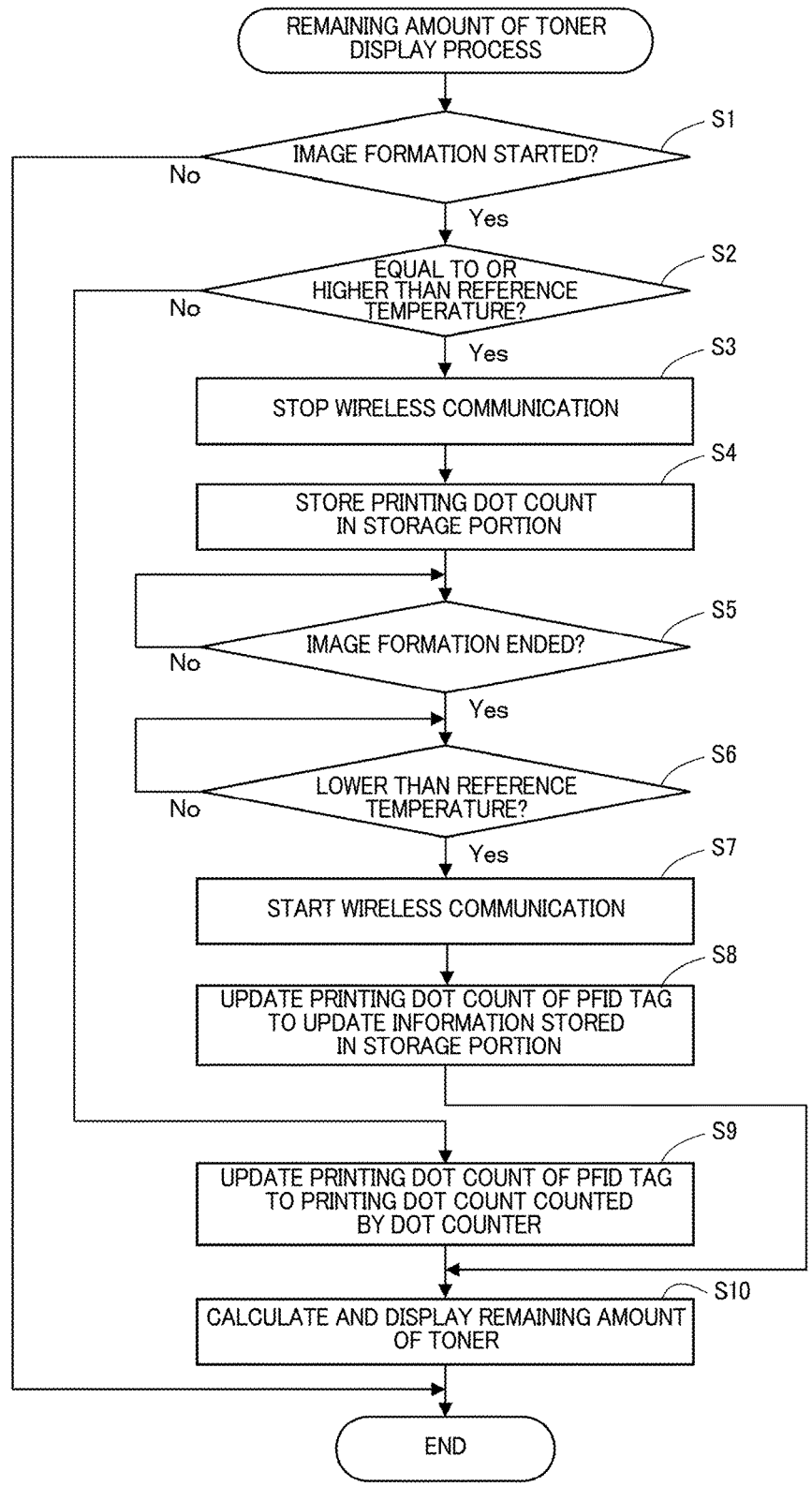
FIG. 3 is a flowchart showing a procedure of a remaining amount of toner display process executed by the controller of FIG. 2.

Next, a description is given of a remaining amount of toner display process executed by the controller 9, with reference to the flowchart of FIG. 3. It is noted that in the drawing, S1, S2, . . . represent processing procedures (step numbers).

<Step S1>

As shown in FIG. 3, in step S1, the second determination processor 92 of the controller 9 determines whether or not an image formation on a sheet has been started by the image former 11.

Upon determining that an image formation on a sheet has been started by the image former 11 (step S1: Yes), the controller 9 moves the process to step S2. On the other hand, upon determining that an image formation on a sheet has not been started by the image former 11 (step S1: No), the controller 9 ends the remaining amount of toner display process.

<Step S2>

In step S2, the first determination processor 91 of the controller 9 determines whether or not a temperature detected by the temperature detector 83 is equal to or higher than the reference temperature (for example, 60° C.).

Upon determining that the detected temperature is equal to or higher than the reference temperature (step S2: Yes), the controller 9 moves the process to step S3. On the other hand, upon determining that the detected temperature is lower than the reference temperature (step S2: No), the controller 9 moves the process to step S9.

<Steps S3 and S4>

The communication controller 94 of the controller 9 stops the wireless communication between the RFID tag 81 and the reader/writer 82 (step S3), and stores the printing dot count counted by the dot counter 93 in the storage 95 (step S4).

<Step S5>

In step S5, the second determination processor 92 of the controller 9 determines whether or not an image formation on a sheet has been ended by the image former 11.

Upon determining that the image formation on a sheet has been ended (step S5: Yes), the controller 9 moves the process to step S6. On the other hand, upon determining that the image formation on a sheet has not been ended (step S5: No), the controller 9 performs the process of step S5 until the second determination processor 92 determines that the image formation on a sheet has been ended (step S5: Yes).

<Step S6>

In step S6, the first determination processor 91 of the controller 9 determines whether or not a temperature detected by the temperature detector 83 is lower than the reference temperature.

Upon determining that the detected temperature is lower than the reference temperature (step S6: Yes), the communication controller 94 of the controller 9 starts a wireless communication between the RFID tag 81 and the reader/writer 82 (step S7). On the other hand, upon determining that the detected temperature is not lower than the reference temperature (step S6: No), the first determination processor 91 performs the process of step S6 until it determines that the detected temperature is lower than the reference temperature (step S6: Yes).

<Step S7>

In step S7, the communication controller 94 of the controller 9 starts a wireless communication between the RFID tag 81 and the reader/writer 82 (step S7).

<Step S8>

In step S8, the communication controller 94 of the controller 9 updates the printing dot count stored in the RFID tag 81 to the printing dot count stored in the storage 95.

<Step S9>

When, in step S2, the first determination processor 91 of the controller 9 determines that the detected temperature is lower than the reference temperature (step S2: No), in step S9, the communication controller 94 of the controller 9 updates the printing dot count stored in the RFID tag 81 to the printing dot count counted by the dot counter 93.

<Step S10>

In step S10, the display processor 96 of the controller 9 calculates the remaining amount of toner from the printing dot count stored in the RFID tag 81, and displays the remaining amount of toner on the display 122 of the operation/display 12.

As described above, in the image forming apparatus 10, a wireless communication between the RFID tag 81 and the reader/writer 82 is stopped on the condition that a temperature detected by the temperature detector 83 is equal to or higher than the reference temperature while an image is being formed on a sheet. That is, in the image forming apparatus 10, a wireless communication is stopped in an environment where there is a possibility that a wireless communication between the RFID tag 81 and the reader/writer 82 cannot be performed appropriately due to an increase of temperature of the reader/writer 82 during the image formation and variation between products of the RFID tag 81. This prevents information of the RFID tag 81 from being updated to erroneous information, and prevents the display 122 from displaying an erroneous display.

On the other hand, in the image forming apparatus 10, update information for the RFID tag 81 such as the printing dot count is stored in the storage 95 while a wireless communication between the RFID tag 81 and the reader/writer 82 is stopped. In addition, the update information stored in the storage 95 is written to the RFID tag 81 when a wireless communication between the RFID tag 81 and the reader/writer 82 is started. With this configuration, in the image forming apparatus 10, information stored in the RFID tag 81 can be updated appropriatedly to the update information that was stored when a wireless communication was stopped. As a result, in the image forming apparatus 10, it is possible to correctly display information such as the remaining amount of toner on the display 122.

The present disclosure is applicable to a configuration where a wireless communication between the RFID tag 81 and the reader/writer 82 is stopped or started based on a result of determination by the first determination processor 91, without determination by the second determination processor 92. That is, in the flowchart shown in FIG. 3, the remaining amount of toner display process may be performed in a procedure omitting steps S2 and S6.

In addition, the predetermined condition for determining that the temperature detected by the temperature detector 83 is lower than the reference temperature may be, for example, that after an interlock of an image formation operation is set, a release of the interlock is confirmed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an image former including a developing portion configured to form a toner image on an image carrier;
   a toner container storing toner that is supplied to the developing portion;
   a toner container attachment to which the toner container is detachably attached;

an RFID tag provided on the toner container and configured to store predetermined information;

a reader/writer configured to perform a wireless communication with the RFID tag in a state where the toner container is attached to the toner container attachment;

a storage configured to store update information that is to be written to the RFID tag;

a temperature detector configured to detect a temperature or an ambient temperature of the reader/writer; and a controller, wherein the controller is configured to execute:

a first determination processor configured to determine whether or not a temperature detected by the temperature detector is equal to or higher than a predetermined reference temperature; and a communication controller configured to, when the first determination processor has determined that the temperature detected by the temperature detector is equal to or higher than the reference temperature, stop the wireless communication between the RFID tag and the reader/writer, and when a predetermined condition for determining that the temperature detected by the temperature detector is lower than the reference temperature is satisfied, start the wireless communication between the RFID tag and the reader/writer and cause the reader/writer to update information stored in the RFID tag to the update information that was stored in the storage between a time point when the first determination processor determined that the temperature detected by the temperature detector is equal to or higher than the reference temperature and a time point when the predetermined condition was satisfied.

2. The image forming apparatus according to claim 1, wherein the predetermined condition is that the first determination processor determines that the temperature detected by the temperature detector is lower than the reference temperature.

3. The image forming apparatus according to claim 1, wherein the controller is further configured to execute:

a second determination processor configured to determine whether or not an image formation on a sheet is being performed by the image former, and the communication controller stops the wireless communication between the RFID tag and the reader/writer on a condition that the second determination processor determines that the image formation on the sheet is being performed by the image former.

4. The image forming apparatus according to claim 3, wherein the predetermined condition is that the second determination processor determines that the image formation on the sheet is not being performed by the image former.

5. The image forming apparatus according to claim 1, wherein the update information is information regarding a remaining amount of toner in the toner container.

6. The image forming apparatus according to claim 5, further comprising:

a display configured to display the information regarding the remaining amount of toner, wherein the controller is further configured to execute:

a display processor configured to display, on the display, the information regarding the remaining amount of toner, based on the update information stored in the RFID tag.

\* \* \* \* \*